Patented May 2, 1939

2,156,298

UNITED STATES PATENT OFFICE 2,156,298

WELDED ARTICLE

Franz Leitner, Kapfenberg, Steiermark, Austria, assignor to Gebr. Böhler & Co. Aktiengesellschaft Wien, Vienna, Germany No Drawing. Application March 16, 1937, Serial No. 131,180. In Austria April 18, 1936

2 Claims. (Cl. 113—112)

This invention relates to welding, referring more particularly to a method of producing strong, sound ductile welds, free from excessive slag inclusions, in nonaustenitic ferrous metals, and to an improved weld joint, so produced, possessing excellent bonding characteristics between the base metal and the deposited filler material.

Chromium nickel alloy steel welding rods have heretofore been used for welding austenitic and nonaustenitic iron and steel and ferrous alloys by fusion deposition welding methods. In some of these austenitic chromium nickel steel welding rods, the nickel has been replaced in whole or in part by manganese without greatly altering the austenitic structure of the welding rod or of the deposited filler metal.

When these well-known austenitic chromium steel alloys containing nickel or manganese or both, are used for welding nonaustenitic ferrous metals, it is possible to obtain sound welds substantially free from blowholes and slag inclusions only by protecting the welding rod in some manner during deposition of the filler metal, and this is usually accomplished either by providing a protective coating on the outside of the rod or by enveloping the molten filler material with a protective gas. Unless such precautions are used during the welding operation, the resulting weld metal is unsound and contains numerous slag inclusions, and the joint between the filler metal and the base metal is mechanically weak: the results of bend tests have shown that fracture occurs in such a weld at the junction of the filler metal and the base metal long before the limit of ductility of the weld metal proper has been attained.

I have discovered that these serious difficulties can be eliminated by a method of welding wherein a filler rod of the following composition is employed, carbon in an amount not exceeding 0.3%; 5% to 25% chromium; 3% to 27% nickel; 3% to 18% manganese; 0.3% to 6% molybdenum; the remainder principally iron. Experiments have shown that a welding rod of this composition will produce a sound weld of excellent bonding characteristics between two or more contiguous members of nonaustenitic ferrous metal. Also the physical properties of both the deposited weld metal and the weld joint so produced are exceptionally good. Representative physical properties of samples of the welds made in accordance with this invention are as follows:

Maximum stress pounds per sq. inch____ 92,450
Percent elongation (L=5D)_____ 52
Percent reduction of area_____ 55
Impact strength (Mesnager) ft. lb./sq. cm _____ 108

The figures for maximum stress, elongation, and reduction of area were obtained by testing samples of the deposited weld metal; the impact strength is that of a welded joint. The base material of the welded joint contained 0.3% carbon and 2.8% chromium and had a maximum strength of 102,000 lbs. per sq. in. The filler rod applied had the following composition: carbon 0.14%, manganese 7.5%, chromium 17.8%, nickel 7.6%, molybdenum 1.3%.

It can readily be seen from the results of these tests that the welds possess better physical properties than those hitherto obtained. These results also show that a particularly good fusion contact has been obtained at the junction of the weld metal and the base metal.

The invention is applicable to both oxyacetylene and arc welding methods.

The use of molybdenum as one of the constituents of the welding rod is of the utmost importance in securing a good bond between the base metal and the filler metal, so that the surface of transition between the base metal and the filler metal is not a mechanically weak area.

In the welding of the nonaustenitic ferrous metals it is sometimes necessary to increase the temperature of fusion of the welding rod to obtain a particularly good fusion contact with the base metal. It is within the invention to adapt the welding rods for such high temperature welding by the addition of one or more of alloying elements of the group consisting of vanadium, titanium, tantalum, zirconium, cobalt and silicon in a total amount not exceeding 3% of the entire composition.

It is also possible to replace the molybdenum content, either wholly or in part, by tungsten.

A few representative compositions which I have found to make welding rods of excellent welding characteristics are as follows:

| | | | |
|---|---|---|---|
| Carbon | 0.17% | 0.12% | 0.07% |
| Chromium | 20.00% | 12.00% | 18.00% |
| Manganese | 8.00% | 11.00% | 6.00% |
| Nickel | 14.00% | 20.00% | 10.00% |
| Molybdenum | 2.50% | 1.00% | |
| Silicon | | | 1.50% |
| Tungsten | | 2.00% | 0.60% |

I claim:

1. An article comprising at least two contiguous members of nonaustenitic ferrous metal bonded with a fusion deposited weld composed of an austenitic steel containing carbon in an amount not exceeding 0.3%; 5% to 25% chromium; 3% to 27% nickel; 3% to 18% manganese; 0.3% to 6% metal of the group consisting of molybdenum and tungsten; the remainder principally iron.

2. An article comprising at least two contiguous members of nonaustenitic ferrous metal bonded with a fusion deposited weld composed of an austenitic steel containing carbon in an amount not exceeding 0.3%; 5% to 25% chromium; 3% to 27% nickel; 3% to 18% manganese; 0.3% to 6% metal of the group consisting of molybdenum and tungsten; at least one metal of the group consisting of vanadium, titanium, tantalum, zirconium, cobalt, silicon, the total amount of said metal or metals not exceeding 3%; the remainder principally iron.

FRANZ LEITNER.